March 7, 1950     C. O. HOWARD     2,500,077
POWER TRANSMISSION FOR GRASS MOWER TRACTION WHEELS
Filed Feb. 20, 1946     2 Sheets-Sheet 1
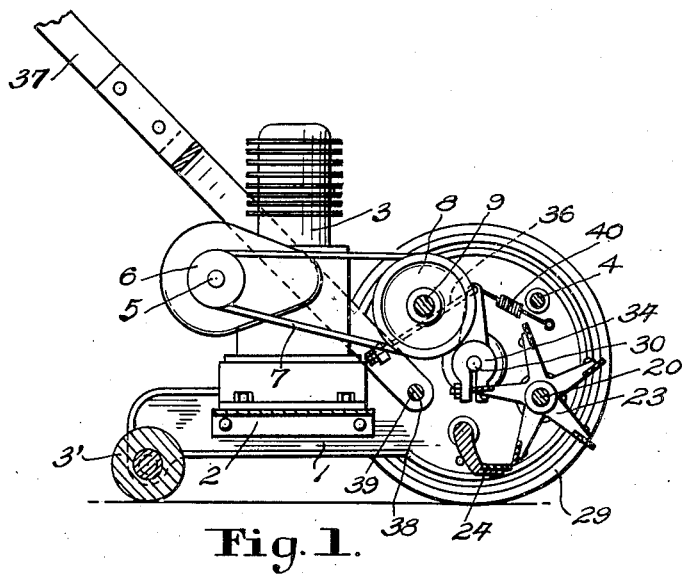
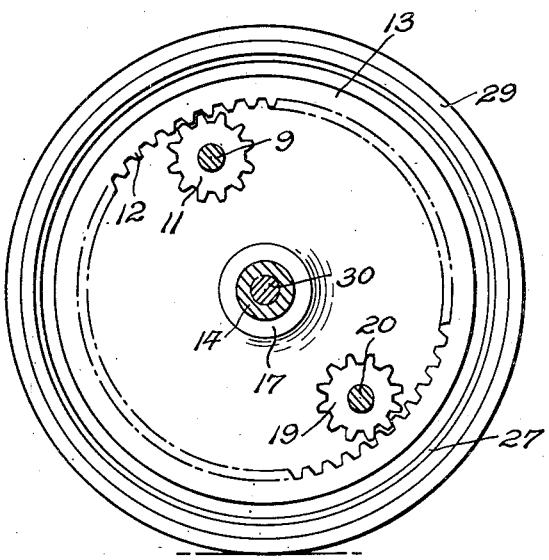
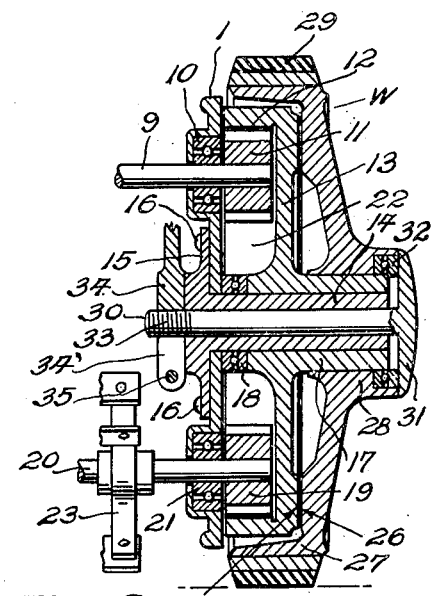
Inventor
Charles O. Howard
By W. S. McDowell
Attorney March 7, 1950  C. O. HOWARD  2,500,077
POWER TRANSMISSION FOR GRASS MOWER TRACTION WHEELS
Filed Feb. 20, 1946  2 Sheets-Sheet 2

Inventor
Charles O. Howard
By W. S. McDowell
Attorney

Patented Mar. 7, 1950

2,500,077

UNITED STATES PATENT OFFICE 2,500,077

POWER TRANSMISSION FOR GRASS MOWER TRACTION WHEELS

Charles O. Howard, Columbus, Ohio

Application February 20, 1946, Serial No. 648,858

7 Claims. (Cl. 180—19)

This invention, relating to engine or power-driven lawn or grass mowers, has for its object, among others, to provide an improved construction whereby the grass-cutting means of such a mower can continue to operate under engine power while the mower is standing still.

It is another object of the invention to provide an engine-driven lawn mower having an improved power-driven wheel assembly provided with an inner engine-driven wheel member and an outer ground-engaging wheel member loosely rotatable about the inner wheel member, the said wheel members being formed with adjoining clutch faces, and means being provided, extending through the axial center of the wheel assembly, for moving said wheel members relative to each other for the purpose of bringing the clutching faces thereof into and out of driving engagement, so that engine power applied to the inner wheel member may be transmitted to the outer wheel member in a readily controlled and effective manner.

A further object of the invention is to provide such a lawn mower with a pivotally movable guiding handle and to utilize the movement of said handle for the purpose of controlling the clutching engagement between the inner and outer wheel members of the engine-driven wheel assemblies.

Still another object of the invention is to provide a power-driven lawn mower in which the inner wheel member of each wheel assembly is formed with internal gear teeth which mesh with those of an engine-driven pinion, the inner wheel member turning loosely around an axial support, the gear teeth of said inner wheel member also meshing with those of a second pinion having a shaft formed for the support of a rotatable grass-cutting reel, whereby to cause rotation of said reel in unison with that of the inner wheel member, the latter having clutching engagement with an outer ground-engaging wheel member, whereby to control the linear speed of advance of the mower over a lawn surface without interrupting the rotation of the cutting reel.

Still a further object of the invention is to provide an improved engine-driven grass cutter or lawn mower so constructed that in cutting around shrubbery, or other difficult places of restricted area, the mower can be moved manually in a manner independent of the operation of the motive power, the associated grass-cutting reel continuing to run under engine power independently of the power supplied to the supporting wheels.

For a further understanding of the invention, reference is to be had to the following description and the accompanying drawings, wherein:

Fig. 1 is an elevational view, partly in vertical longitudinal cross section, of an engine-driven lawn mower constructed in accordance with the present invention;

Fig. 2 is a vertical transverse sectional view taken through one of the power-driven wheel assemblies of the mower;

Fig. 3 is a vertical sectional view through said wheel assembly, disclosing the inner wheel member thereon and the pinions in engagement with the internal gear teeth of the inner wheel member;

Figure 4:
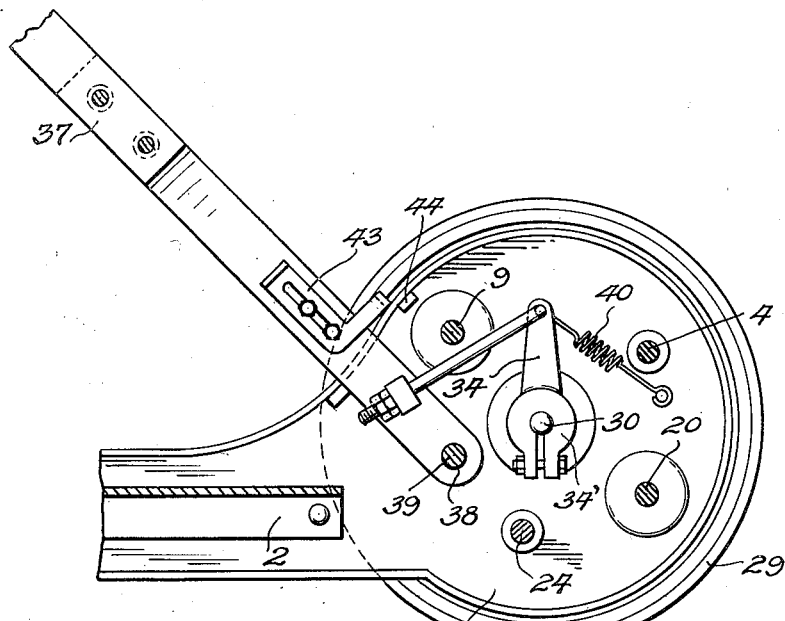
Fig. 4 is a fragmentary vertical sectional view taken through the mower and illustrating the guiding handle and the mechanism connected therewith for governing the clutching action of the supporting wheels of the mower.

Referring more particularly to the drawings, the numeral 1 designates a pair of vertically disposed, relatively spaced and parallel frame plates. These plates are united toward the rear of the mower by a transversely extending engine bed 2, on which may be mounted a small internal combustion engine 3. At the rear of the bed, the frame plates carry a ground-engaging roll or roller 3'. At the forward part of the mower, the frame plates are united by a transversely extending rod 4. The engine drives a shaft 5, which may carry a pulley wheel 6, over which passes an endless belt 7, the latter being also trained over a second pulley wheel 8 mounted on a transversely extending shaft 9. This shaft is journaled in antifriction bearings 10 mounted in the side or frame plates 1. With the engine in operation, rotating power is applied to the shaft 9, and the ends of said shaft project outwardly beyond the side plates 1 and the bearings 10 to receive pinions 11 at each end thereof. The teeth of these pinions mesh with internal gear teeth 12 formed on a pair of inner wheel members 13, the latter constituting parts of wheel assemblies W arranged at each side of the mower and forwardly thereof.

Each of these wheel assemblies includes a stationary axially disposed bearing sleeve 14, having a flanged inner end 15 which is bolted or otherwise secured, as at 16, to the inner surface of the adjoining side plate 1. Each of the inner wheel members 13 includes an enlarged tubular hub 17, which is rotatable on and about the associated sleeve 14. If desired, thrust bearings 18 may be interposed between the inner end of each hub 17 and its adjoining side plate, as shown in Fig. 2.

Also meshing with the internal gear teeth of each of the inner wheel members is a pinion 19, the latter being carried by the ends of a transversely extending shaft 20 which is journaled for rotation in antifriction bearings 21 mounted in the frame plates 1. It will be noted that the pinions 11 and 19 are disposed in an annular recess 22 formed in one side of each of the inner wheel members 13, whereby to provide for compactness in design and to receive and retain a lubricant.

The shaft 20, between the frame plates 1, carries a grass-cutting reel 23 of conventional design, the cutting edges of the reel cooperating, as usual, with a cutter bar 24. By this arrangement, it will be seen that engine power supplied to the inner wheel members effects the rotation of the cutter reel through the planetary gear drive disclosed.

The outer face of each of the inner wheel members, contiguous to the periphery thereof, is formed with an annular clutch facing 25 which cooperates with a similar clutch facing 26 provided on the inner surface of each of a pair of outer ground-engaging supporting wheel members 27. Each of the outer wheel members is formed with a hub 28 which is freely rotatable and longitudinally slidable on the extended hub 17 of an associated inner wheel member. The outer periphery of each of the wheel members 27 may advantageously be provided with a tire 29 adapted for engagement with the ground. It will be noted that the tire-receiving portion of the outer wheel members 27 surround and project over the inner wheel members, so that the latter are confined compactly within the interior of the outer wheel members.

In order to move the outer wheel members into and out of clutching engagement with the engine-driven inner wheel members, whereby to utilize the power of the engine for the purpose of applying propulsion forces to the lawn mower when desired, each of the bearing sleeves 14 has slidably mounted therein a clutch-actuating bolt 30. Each bolt is provided at its outer end with an enlarged head 31, the diameter of which is such as to cause its engagement with the outer end portions of the associated wheel hub 28. If desired, a thrust bearing 32 may be employed between each of the heads 31 and the associated wheel hub 28. The shank of each bolt extends through one of the sleeves 14 and has its inner end threaded as at 33 in a correspondingly threaded opening formed in a crank lever 34. Each of these levers may be provided with a split hub 34' having a transverse bolt connection 35 by which the hub of the lever may be firmly and non-rotatably secured to the threaded end of the associated bolt 30. The outer end of each of the levers 34 is linked by a rod 36 with the lower end of a mower guiding handle 37, the latter being pivotally mounted, as at 38, on a rod 39 joined with the frame plates 1. Also, the outer end of each of the levers 34 is connected with a coil spring 40, which balances the handle 37.

Figure 5:
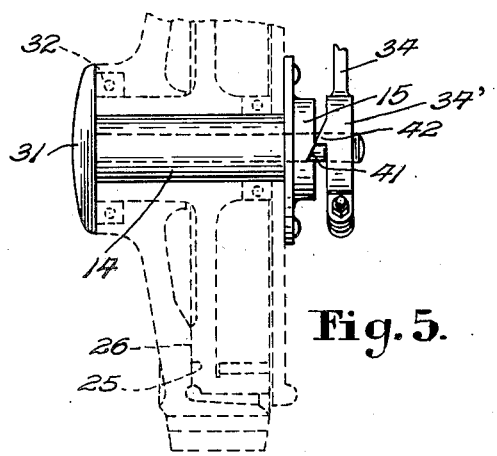
Fig. 5 is a detail elevational view, partly in cross section, of the axially disposed clutch-actuating bolt, its operating lever and the associated cam means, the bolt being shown in a position when the inner and outer members of the associated wheel assembly are in clutching relationship.
Figure 6:
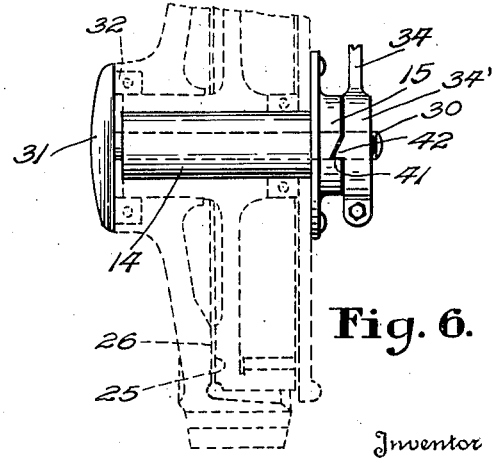
Fig. 6 is a similar view disclosing the parts illustrated in Fig. 5 when the clutch bolt is in a position declutching the inner and outer members of the wheel assembly.

The flanged end 15 of each of the bearing sleeves 14 is formed with a cam notch 41 which is adapted to receive a cam-shaped shoulder 42 provided on the hub portion 34' of each of the levers 34. This arrangement is such that in the operation of the mower, when the handle 37 is manually rocked in an upward direction, the cam levers will be moved to occupy positions in which the shoulders 42 will be disposed beyond the notches 41 and in engagement with the inner faces of the sleeve flanges 15, as shown in Fig. 5. This results in moving the clutch bolts inwardly, so that the headed ends 31 thereof press against the thrust bearings 32, moving the outer wheel members inwardly and longitudinally of the hubs of the inner wheel members, causing relative engagement between the clutching faces 25 and 26, whereby the power of the engine may be utilized in rotating the outer wheel members to produce linear advance of the mower over a lawn. When the handle 37 is rocked downwardly, the shoulders 42 enter the notches 41, as shown in Fig. 6, which forces the headed ends of the bolts outwardly and releases the clutching faces 25 and 26 from driving engagement.

Thus the power of the engine in producing linear advance of the mower is under ready control by the mere actuation of the guiding handle, so that the speed of forward advance of the mower may be regulated to conform with the needs and convenience of an operator. The handle 37 may be provided with an adjustable latching bracket 43 which may be moved into and out of engagement with one or more stationary lugs 44 provided on the frame plates 1. With the bracket in contact with the lugs 44, the mower may be advanced by manual effort, rather than by engine power.

In view of the foregoing, it will be seen that the present invention provides an engine-driven lawn mower in which efficient means are provided for delivering power to the ground-engaging wheels of the mower and for rotating the cutting reel mechanism. Both the wheels and the cutting mechanism may be rotated simultaneously, or through the improved clutch arrangement disclosed, power rotation of the wheels may be discontinued while the rotation of the cutting reel mechanism is maintained. The controls may be readily actuated by rocking the pivoted guiding handle. The mower is simple and convenient to operate and its forward speed is at all times under the ready control of the operator. It will be noted that the supporting wheel construction is essentially simple and compact and with clutch faces of maximum diameter are provided so that the structure is capable of imparting long service without part replacements or repairs.

My improved clutching wheel assembly is, of course, applicable to self-propelled machines other than lawn mowers, for example, various types of garden tools, such as cultivators and the like.

While I have described a single preferred embodiment of my improved lawn mower, nevertheless, it will be understood that the same is subject to certain mechanical variation and modification without departing from the scope of the invention as the same has been defined in the following claims.

I claim:

1. In an engine-driven lawn mower, a frame, axle sleeves stationarily carried by said frame, forwardly disposed ground-engaging wheels, each of said wheels comprising an inner member having a hub rotatable about one of said sleeves, said inner member at one side thereof and adjacent to its outer periphery being formed with internal circularly arranged gear teeth, an engine on said frame, a power-supplying shaft journaled in said frame, motion-transmitting means driven by said engine for rotating said shaft, pinions carried by the ends of said power-shaft meshing with the internal gear teeth of said inner wheel members, an annular clutch facing formed on each of the inner members of said wheels adjacent to its outer periphery, said facings being disposed on the sides of said inner members opposite to those containing the internal gear teeth, each of said wheels further including an outer ground-engaging wheel member having a hub rotatable about and slidable on the hub of each of the inner wheel members, each of said outer members being formed on one side with an annular chamber in which an associated inner member is received, the outer wheel members having the chambered portions thereof formed with clutch facings arranged to be brought into and out of engagement with those of said inner wheel members upon sliding movement of the outer members on the hubs of the inner members, a bolt slidably positioned in each of said axle sleeves, one end of each bolt being formed with an enlarged head disposed in engagement with an outer end of the hub of an associated outer wheel member, a cam lever fixed to the end of each bolt opposite to the headed end thereof, a stationary cam on said frame with which said lever is engageable upon rocking movement thereof to impart longitudinal movement to said bolts and the outer wheel members to control the power-imparting engagement between the clutch facings of said inner and outer wheel members, a pivoted guiding handle carried by said frame, and connecting means uniting said handle with the outer end of said cam levers, whereby to impart rotating power to the outer ground-engaging wheel members when the handle is rocked in one direction and interrupt the transmission of such power when the handle is rocked in an opposite direction.

2. In an engine-driven lawn mower as defined in claim 1, in combination with spring means connected with said frame and cam levers and operating to counterbalance said guiding handle.

3. In an engine-driven lawn mower as specified in claim 1, in combination with an adjustable latching means carried by said handle and cooperative with a fixed stop on said frame for preventing rocking movement of said handle in a direction providing for clutching engagement between said inner and outer wheel members.

4. In a power-driven lawn mower, a frame, a tubular bearing sleeve stationarily carried by said frame, a wheel assembly rotatably mounted on said sleeve, said assembly embodying an inner member having a hub rotatably mounted on said sleeve, one side of said inner member being recessed and formed peripherally with internal gear teeth, a power-driven shaft carried by said frame, a pinion on said shaft meshing with the gear teeth of said inner member, an outer ground-engaging wheel member, one side of said outer member being formed with a chamber in which said inner member is positioned, said outer member including a hub rotatably mounted on that of said inner member and slidable longitudinally with respect thereto, complemental clutch facings provided on said inner and outer wheel members contiguous to their outer peripheral portions, a guiding handle pivoted on said frame, and means passing axially through said bearing sleeve and connected with said handle and operative upon movement of the latter to impart longitudinal sliding movement to said outer member to bring said clutch facings into and out of engagement.

5. In an engine-driven grass cutter, a frame, a steering handle on said frame, a pair of supporting wheels journaled on said frame at the front thereof, an internal gear member rotatable within each of said wheels, power-driven means for rotating said internal gear members, oppositely disposed clutch facings formed with said wheels and said internal gear members, a tubular axle for the support of each of said wheels and its internal gear member, and manually operated means movable and passing longitudinally through said axles and engageable with said wheel to shift the latter longitudinally with respect to said axles, whereby to bring said clutch facings into and out of power-imparting engagement.

6. In a portable self-propelled machine, a frame, a tubular axial support carried by said frame, a ground-engaging and clutching wheel assembly comprising a driving member rotatable on said support, said driving member at one side thereof and contiguous to its outer periphery being formed with annular internal gear teeth, engine-driven means engaged with said gear teeth for imparting rotating power to said driving member, a clutching face provided on said driving member contiguous to its outer periphery, a ground-engaging driven member rotatable about the axis of said support, said driven member being recessed on one side thereof to receive said driving member, a clutch face provided internally on said driven member for coacting with the clutch face on the driving member, and manually operated means passing through said axial support for shifting one of said members longitudinally relatively to the other to bring said clutch faces into and out of driving engagement.

7. A wheel assembly for power driven lawn mowers comprising a tubular axial support, a clutch member rotatable freely about said support, said member being formed with internal gear teeth, motor driven means engaging with said gear teeth to effect rotation of said member, the latter being formed on the outer side thereof with an annular clutch face, an outer ground-engaging wheel member rotatable about the longitudinal axis of said support, said ground-engaging member being formed with an internal chamber for the reception of said clutch member, said chamber including a clutch face cooperative with the clutch face of said power-driven clutch member, said ground-engaging member being movable longitudinally of the axis of said support, a movable handle connected with said frame, and means passing through said tubular support and actuated by movement of said handle for governing clutching engagement between the clutch faces of said members.

CHARLES O. HOWARD.

REFERENCES CITED

The following references are of record in the file of this patent:

UNITED STATES PATENTS

| Number | Name | Date |
|---|---|---|
| 986,567 | Herr | Mar. 14, 1911 |
| 1,401,156 | Jenkins | Dec. 27, 1921 |
| 1,554,744 | Mack | Sept. 22, 1925 |
| 1,657,514 | Miller | Jan. 31, 1928 |
| 1,749,189 | Mack | Mar. 4, 1930 |
| 1,779,583 | Blydenburgh | Oct. 28, 1930 |
| 2,138,239 | Irgens | Nov. 29, 1938 |
| 2,298,135 | Klein | Oct. 6, 1942 |